June 2, 1942.  R. W. OLSEN  2,285,226
FLUID FLOW CONTROL
Filed April 29, 1941  2 Sheets-Sheet 1

Inventor:
Ronald W. Olsen,
by Harry E. Dunbar
His Attorney.

June 2, 1942.  R. W. OLSEN  2,285,226
FLUID FLOW CONTROL
Filed April 29, 1941  2 Sheets-Sheet 2

Inventor:
Ronald W. Olsen,
by Harry E. Dunham
His Attorney.

Patented June 2, 1942

2,285,226

UNITED STATES PATENT OFFICE 2,285,226

FLUID FLOW CONTROL

Ronald W. Olsen, Bloomfield, N. J., assignor to General Electric Company, a corporation of New York Application April 29, 1941, Serial No. 390,963

8 Claims. (Cl. 236—1)

My invention relates to fluid flow controls and although not limited thereto, it has particular application to an arrangement for automatically controlling the flow of combustion air to a furnace.

In furnaces, and particularly in furnaces which are automatically fed with fuel, such as by a stoker, it is desirable to so control the flow of combustion air entering the furnace that the flow will be maintained at a substantially constant rate during operation of the draft fan irrespective of normal variations in the thickness of the fuel bed. Also it is desirable that the air flow be gradually increased to the constant rate when the fan operation is started and gradually decreased from this rate when the fan operation is stopped in order to provide efficient combustion conditions.

It is, therefore, an object of my invention to provide an improved arrangement for controlling the flow of a fluid to such a device in the desired manner.

Another object of my invention is to provide an improved arrangement for maintaining a substantially constant flow of combustion air to a furnace.

A further object of my invention is to provide an improved control arrangement for a furnace for gradually cutting off the flow of combustion air after the call for heat in the space to be heated has been satisfied.

A further object of my invention is to provide an improved control arrangement for a furnace for actuating the fan, upon a call for heat, after the stoker has been energized.

My invention will be more fully set forth in the following description referring to the accompanying drawings, and the features of novelty which characterize my invention will be pointed out in the claims annexed to and forming a part of this specification.

Figure 1:
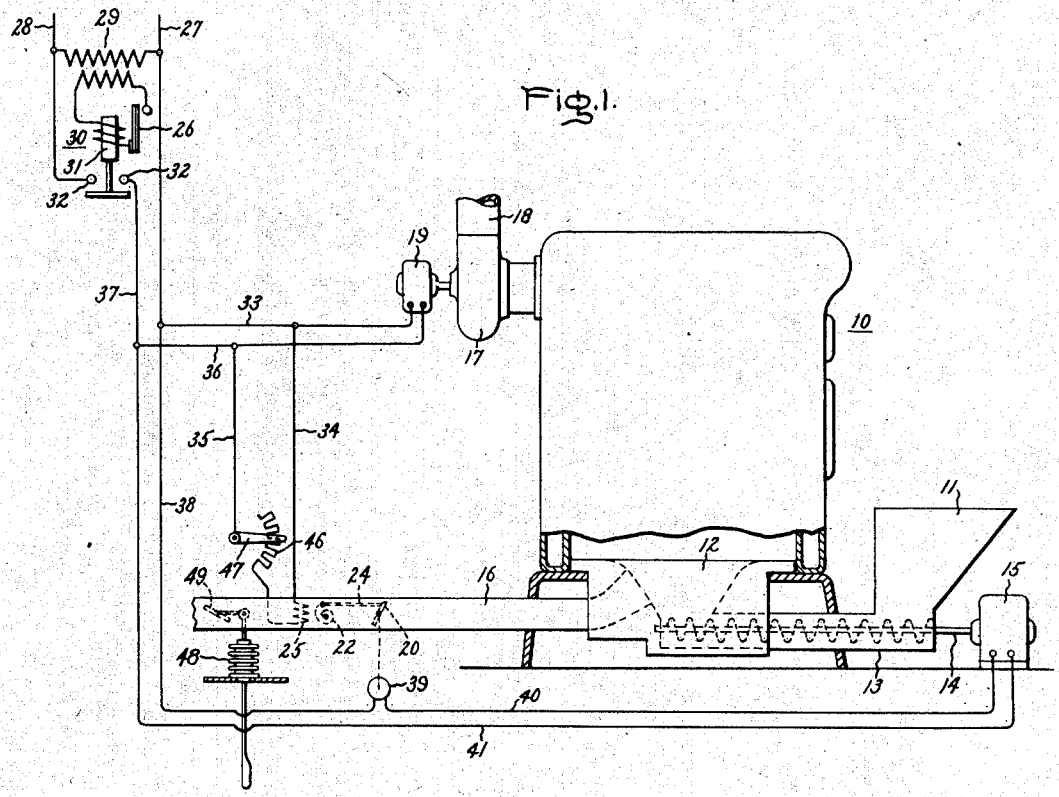
Figure 2:
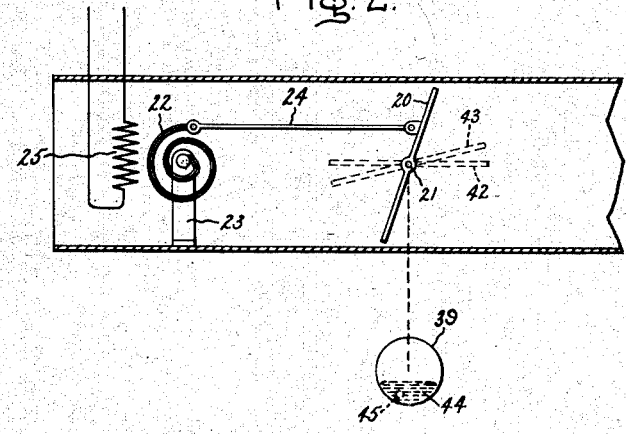
Figure 3:
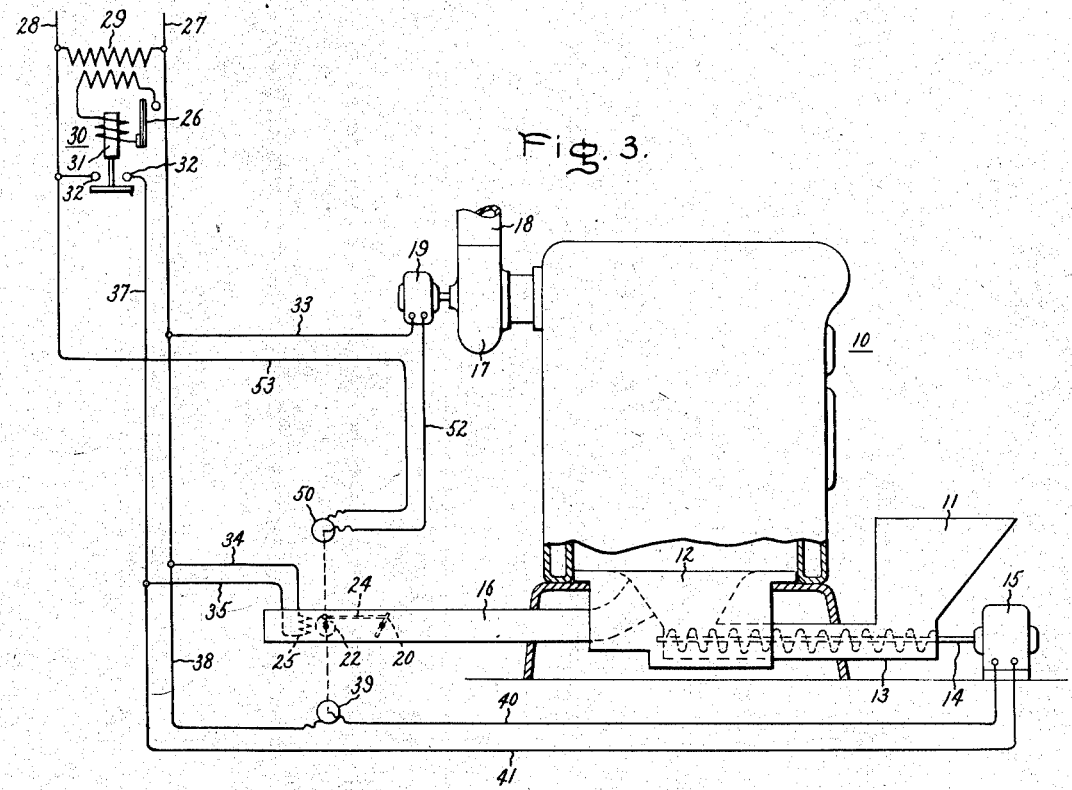
Figure 4:
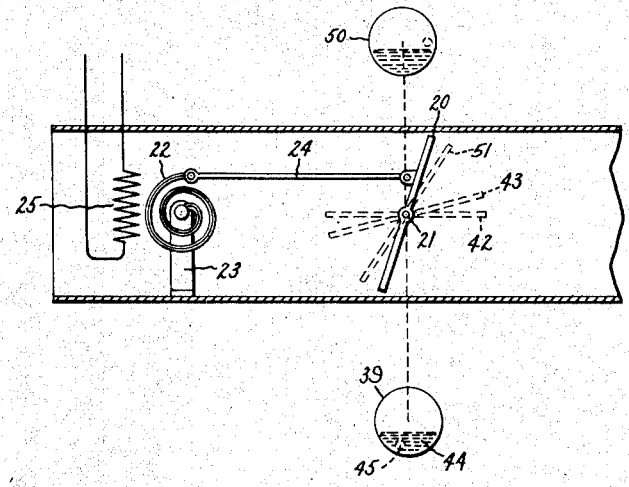

Referring to the drawings, Fig. 1 is a side elevation of a stoker-fired furnace in partial section with a control which is provided with an embodiment of my invention; Fig. 2 is an enlarged view of a portion of the control illustrated in Fig. 1; Fig. 3 illustrates a modification of the control illustrated in Fig. 1; and Fig. 4 is an enlarged view of a portion of the control illustrated in Fig. 3.

In the arrangements illustrated in the drawings, I have provided an air flow control for a stoker-fired furnace which includes a damper in a duct through which the combustion air passes, the damper being movably operated by a thermal responsive device. An electric heating coil is mounted adjacent the thermal responsive device, or in heat conductive relationship thereto, the coil being adapted to emit a substantially constant amount of heat. In order to control the amount of heat which is received by the thermal responsive device from the heating coil so that this amount of heat received will be a function of the velocity of the air passing through the duct, the coil is mounted in the duct so that it will be subjected to the cooling effect of the air passing therethrough. The thermal responsive device is so arranged as to close the damper when the device is relatively cool and open it when it is relatively warm, and thus it will be seen that if the velocity of the air through the duct is relatively low, the heat from the coil will cause the damper to be opened wide. However, if the velocity of the air through the duct is relatively high, heat will be conducted away from the coil and thermal responsive device at a relatively rapid rate, thus causing the thermal responsive device to become relatively cooler so as to cause the damper to move to a more closed position. In this manner, for variations in the thickness in the bed of fuel, a substantially constant flow of air will be maintained to the furnace. I may also provide a switch arrangement operable upon movement of the damper to predetermined positions for controlling the operation of the fan and fuel feed motors. Thus, one switch may be placed in series with the fuel feed motor and operable to deenergize it when the damper is in its substantially fully open position. Such an arrangement per se is described and claimed in my copending application Serial No. 390,964, which is assigned to the same assignee as this present invention. Another switch may be connected in series with the fan motor and may move to an open position when the damper has moved to a relatively closed position.

Referring more particularly to Figs. 1 and 2 of the drawings, I have illustrated a furnace indicated generally by the numeral 10, which may be fed with fuel in any suitable manner such as by a stoker. This stoker includes a hopper 11 in which the fuel, such as coal, may be placed, and the hopper connects with a retort 12 on which a bed of coal may be burned within the furnace, through a feeding tube 13. The fuel may be fed from the hopper 11 through the tube 13 to the retort 12 by means of a rotating screw 14 within the tube 13. The screw may be rotated in any suitable manner, such as by means of a constant speed electric motor 15. In order to provide air so that the coal will burn in the retort 12, any suitable passage, such as a duct 16, is provided which connects at one end with the retort 12. In order to obtain a suitable draft, a fan 17 is provided in a flue 18, the fan being operated in any suitable manner, such as by a constant speed motor 19. Also, instead of having an induced draft, a forced draft, or natural draft arrangement may be provided.

It has been found in the operation of coal stokers that at times the fuel bed may be thick and at other times it may be thin, so that the fuel bed may offer a greater or a lesser resistance to the forced or induced draft. In addition, natural draft conditions may help or hinder the draft. Such changeable conditions normally tend to vary the amount of combustion air entering the furnace. Thus, if the fuel bed is light the forced draft will tend to produce blasting of the fire, and if the fuel bed is thick the forced draft may not provide sufficient combustion air. It will be seen, therefore, that it is desirable to provide an arrangement for controlling the amount of air flowing to the retort so that a substantially constant air flow will be maintained regardless of the changeable conditions of the fuel bed or furnace system. I have, therefore, provided a damper 20 within the duct 16 for controlling the area of the passage within the duct. The damper may be mounted for movement in any suitable manner, such as through a shaft 21. Movement of the damper is caused through a thermal responsive device 22 which is stationarily mounted at one end through the bracket 23, and which is connected at the other end to the damper through a suitable linkage 24. Variations of the temperature of the thermal responsive device will cause its free end to flex and cause corresponding movement of the movable damper 20. In order to cause variations in the temperature of the thermal responsive device 22 corresponding with variations in the velocity of the air passing through the duct 16, I provide a heating coil 25, which may be mounted in heat-conductive relationship with the thermal responsive device 22 in any suitable manner so that the amount of heat received by the latter is a function of the air velocity. In the illustrated embodiment of my invention the coil is situated in the duct so that it is adjacent the device 22 and so that it is subjected to the cooling effect of the air passing through the duct. Any other suitable heating arrangement may be provided, and, of course, the heating coil or thermal responsive device, or both, may be mounted in an auxiliary duct so as to be cooled by only a portion of the air passing through the duct 16. Also, any other suitable arrangement may be provided for controlling the amount of heat passing from the heating coil to the thermal responsive device 22 so that the flow of heat will be a function of the variations in velocity of the air passing through the duct.

The electric heating coil 25 may be energized by connecting it across a suitable source of power in any suitable manner, such as energizing it in response to a call for heat. Thus, a suitable condition responsive device, such as a thermostat 26 is placed within the room to be heated and when in a closed position will energize a circuit to connect the coil 25 across a suitable source of power, indicated by lines 27 and 28. The energizing circuit includes a transformer 29, a relay 30 with an operating coil 31 which is energized when the contacts of the thermostat close so that contacts 32 of the relay will be closed. The energizing circuit for the heater 25 may be traced from line 27 to conductors 33 and 34, heating coil 25, conductors 35, 36, and 37, closed contacts 32, back to the other power line 28. The fan motor 19 and feed motor 15 are also energized when the switch contacts 32 are closed. The energizing circuit for the fan motor 19 may be traced from one line 27, conductor 33, fan motor 19, conductors 36 and 37, contacts 32 and back to the other power line 28. The energizing circuit for the feed motor may be traced from line 27, conductor 38, a switch 39, whose function will be described below, conductor 40, feed motor 15, conductors 41 and 37, contacts 32, back to line 28.

As described in my above-mentioned copending application, a suitable arrangement, such as the switch 39, may be provided in order to de-energize the fuel feeding motor whenever the air flow control opens to a predetermined maximum position. Thus, when the damper 20 reaches a predetermined maximum position indicated by the dotted lines 42 the system resistance or fire bed thickness will have reached a predetermined maximum amount. This indicates that there is sufficient unburned fuel in the fuel bed so that the fuel feeding motor may be turned off until the system reactance decreases to such a value that the damper 20 may move to a less wide position, such as that indicated by the dotted lines 43, at which time the fuel feeding motor may again be energized. The switch 39 may be of any suitable type, such as a mercury switch and may be mounted on the extension of the shaft 21 upon which the damper 20 is mounted. The switch 39 may be so constructed and so mounted in relation to the shaft 21 that it will provide a conducting path when in the position shown in Fig. 2 and when the damper is moving in the range between this position and that indicated by the dotted lines 43, and will open the feed motor circuit when the damper is moving in the range between the positions indicated by the dotted lines 42 and 43. This may be accomplished with a conventional mercury switch which has contacts adapted to be connected to conductors 38 and 40, a pool of mercury 44 and a central barrier with a hole 45 properly positioned to allow the mercury to flow therethrough and electrically connect the switch contacts when the switch is within the range of positions as indicated above. If it is not desired to provide a switch control arrangement for turning off the fuel feed motor when the damper 20 has reached a predetermined maximum position, the switch 39 may be omitted and the conductor 38 connected directly to the conductor 40.

Operation of my improved control device shown in Figs. 1 and 2 is as follows: When the thermostat 26 calls for heat it will close its contacts, energize the relay 30, which closes contacts 32, thus causing energization of the heating coil 25, the fan motor 19, and fuel feeding motor 15 through circuits which have already been traced above. The incoming air will, therefore, pass through the duct 16 at a particular rate depending upon the capacity of the fan 17 and the amount of system resistance which is determined predominantly by thickness of the fuel bed. Therefore, for any predetermined fuel bed thickness, or system resistance, the damper 20 will assume a predetermined position so as to maintain a substantially constant flow of combustion air to the furnace. As the fuel bed builds up and increases the system resistance, air will pass through the duct 16 at a lower rate so that more heat emitted from the coil 25 will be conducted to the temperature responsive device 22, or the device 22 will be allowed to attain a higher temperature. This will cause its free end and linkage 24 to move to the right so that the damper 20 will be pushed to a wider open position in order to keep the constant flow of air flowing to the furnace even though the fire bed thickness has increased. Conversely, if the fuel bed becomes thinner the amount of air flow through the duct tends to increase, which will cool off the temperature responsive device 22 and cause the damper 20 to be moved to a more closed position, so as to maintain the substantially constant flow of air. If for any reason the fuel bed obtains a predetermined maximum thickness so that the damper 20 must move to the position indicated by the dotted lines 43, sufficient coal has been conducted to the fuel bed through the tube 13 so that the switch 39 will open its contacts and deenergize the fuel feed motor until the fuel bed has been burned down to such a point that the damper will move to a position slightly more closed than that indicated by the dotted lines 43 at which time the switch 39 will again provide a conducting path to energize the fuel feeding motor 15. Suitable stops may be provided, if desired, for limiting the movement of the damper between any suitable limits.

A simple arrangement for adjusting the amount of combustion air which is desired for any particular installation may be provided through a potentiometer arrangement which includes an adjustable resistor 46 which is placed in one of the lines which energizes the coil 25. Thus, with any particular size fan, by varying the position of the potentiometer 46 the energization of the coil 25 may be varied, which will in turn control the amount of heat emitted therefrom. Thus, if the energization of the coil 25 is increased the damper 20 will be caused to open wider thus increasing the air flow to the furnace. Conversely, if the energization of the coil 25 is decreased it will decrease the value of air flow which will be provided for the furnace. This may be accomplished by manually adjusting a movable contact 47 so that the air flow may be set to correspond to the fuel feed flow for any particular installation. Also, if desired, an arrangement may be provided for varying the amount of fuel feed during different seasons of the year, such as by providing a damper for throttling the fan, the damper being controlled by an arrangement responsive to the level of the outdoor temperature, such system being described and claimed in my above-mentioned co-pending application. Thus, a bellows 48 has a bulb responsive to outdoor temperature which controls the movement of a damper 49 through suitable linkage so that during the spring and fall seasons the damper 49 will be partly closed, while during the winter months it will assume a wide open position. When the second damper 49 is partially closed the vane 20 will operate wider open which will be nearer the fuel shut-off position for the switch 39.

Referring to Fig. 3, I have provided a modification of the system disclosed in Fig. 1, the system of Fig. 3 being similar to that shown in Fig. 1 except a switching arrangement is employed to deenergize the fan motor when the damper has moved to a predetermined closed position. Thus, applying in Fig. 3 like numerals to describe like parts, instead of having the fan motor 19 connected across the power lines 27, 28 through the relay 30 only, I provide a switch 50 which is also placed on the extension of the shaft 21 of the damper 20. The switch 50 may be of any suitable type, such as a mercury type switch may be so designed and positioned on the shaft that it will remain closed for all movements of the damper 20 except when the damper moves to its nearly closed position or to the position indicated by the dotted lines 51. Thus, the fan motor circuit may be traced from the line 27, conductor 33, fan motor 19, conductor 52, switch 50, and conductor 53, back to the line 28. Thus, in the system as disclosed in Fig. 3, when the thermostat closes its contacts and energizes the circuit which closes the contacts 32, the heater 25 and fuel feed motor will immediately become energized, but the fan motor will not become energized until the damper attains a predetermined position, such as that indicated by the dotted lines 51, at which time the switch 50 will close its contacts. When the thermostat opens its contacts, after a call for heat has been satisfied, the feed motor and heater will immediately become deenergized but the fan motor will remain energized until the damper moves to a range between that indicated by the dotted lines 51 and the off position shown in Fig. 4. Thus, the thermostat controls the operation of the feed motor directly and the fan motor indirectly, or through the air flow control arrangement. Such a system will decrease relatively slowly the amount of air passing to the furnace for the period following the opening of the thermostat's contacts, or after the call for heat has been satisfied. When the amount of combustion air passing to a furnace is cut off abruptly the carbon monoxide will not have sufficient oxygen to burn to carbon dioxide, thus causing wasting of the fuel. However, if the temperature of the fire may be gradually cut down in proportion to the decreasing of the combustion air passing to the fire the amount of carbon monoxide being formed will decrease so that that amount which is formed will have sufficient air to cause it to burn into carbon dioxide.

The operation of the system described in Fig. 3 is the same as that which has already been described in connection with Fig. 1, except as has already been noted. Thus, after the thermostat has been turned off, the fan motor 19 will not immediately be shut off but will remain running while the damper 20 is moving toward its closed position, thus gradually decreasing the amount of air passing to the furnace during this period. After the damper reaches its position indicated by the dotted lines 51 the passageway for the air will be practically closed and the switch 50 will open and cause the fan motor to be deenergized. When there is again a call for heat, thus causing the thermostat's contacts to close, the coil 25 and the heat motor 15 will immediately be energized until the coil 25 has heated the thermal responsive device 22 sufficiently so that the damper 20 will move to a position slightly more open than that indicated by the dotted lines 51. Thus, this system also prevents blasting of the fire at the moment the thermostat calls for heat and allows a small amount of fuel to pass into the fire bed before the fan motor is turned on. With the system shown in Figs. 3 and 4, of course the switch 39 may be omitted, if desired.

From the above it will be seen that I have provided an improved air flow control system for maintaining the flow of air to any suitable device within predetermined limits, or within a predetermined range. By employing a coil which emanates a substantially constant flow of heat and by controlling, in response to the change in air velocity, the amount of heat passing from the coil to a temperature responsive device I am able to actuate a damper so as to maintain a substantially constant flow of air to the device. Furthermore, when my improved air flow control system is employed with a furnace it will be noted that during off positions the damper is completely closed, thus cutting down off period burning and saving fuel during hold fire. It is apparent that my improved air flow control is not limited to its application to a furnace, but may be applied to control the air flow to any suitable device or space. Thus, my air flow control may be applied to control the amount of air flowing into a room, or to control the amount of any gas or any suitable fluid flowing to or through any suitable device. Furthermore, when employing my improved air flow control with a heating device, such as a furnace, the fan may be controlled by the thermostat through my air flow control. Thus, when the damper reaches a predetermined position the fan may be actuated. This furnace control may also be employed in combination with an arrangement for deenergizing the fuel feed motor when the damper reaches a predetermined maximum position.

Modifications of the particular arrangements which I have disclosed embodying my invention will occur to those skilled in the art, so that I do not desire my invention to be limited to the particular arrangements set forth and I intend in the appended claims to cover all modifications which do not depart from the spirit and scope of my invention.

What I claim as new and desire to secure by Letters Patent of the United States, is:

1. A control for a furnace including an air duct connecting with the combustion chamber thereof, a substantially constant speed motor, a fan driven by said motor for producing a flow of air through said duct to said furnace, a damper movably mounted therein for varying the area of a passage through which the air flows, a temperature responsive device, means including said device for moving said damper in response to variations in the temperature of said device, heating means responsive to a call for heat in the space to be heated by the furnace for heating said device in order to cause movement of said damper, the heating effect of said heating means on said device being varied in response to changes in velocity of air passing through said duct in order to vary the position of said damper so as to maintain a substantially constant flow of air through said duct, and means responsive to movement of said damper for energizing and deenergizing said motor.

2. A control for a furnace including an air duct connecting with the combustion chamber thereof, a substantially constant speed motor, a fuel feeding device driven by said motor, a second substantially constant speed motor, a fan driven by said second motor for producing a flow of air through said duct to said furnace, a damper movably mounted therein for varying the area of a passage through which the air flows, a temperature responsive device, means including said device for moving said damper in response to variations in the temperature of said device, means for heating said device in order to cause movement of said damper, the heating effect of said means on said device being varied in response to the changes in the velocity of the air passing through the duct in order to vary the position of said damper so as to maintain a substantially constant flow of air through said duct, means responsive to a call for heat in the space to be heated by the furnace for heating the device in order to cause movement of the damper, and means responsive to a movement of said damper to predetermined positions for controlling said motors.

3. A control for a furnace having a duct connected with the combustion chamber thereof including a substantially constant speed motor, a fan driven by said motor for producing a flow of air through said duct to said furnace, a damper movably mounted therein for varying the area of a passage through which the air flows, a temperature responsive device, means including said device for moving said damper in response to variations in the temperature of said device, means for heating said device in order to cause movement of said damper, the heating effect of said means on said device being varied in response to changes in the velocity of air passing through said duct in order to vary the position of said damper so as to maintain a substantially constant flow of air through said duct, means responsive to a call for heat in the space to be heated by the furnace for heating said device in order to cause movement of said damper, switch means mounted on said damper so that movement of said damper to a predetermined closed position will cause said switch to open and deenergize said motor.

4. In combination, a furnace having a fuel bed variable in thickness, an electrically operated fan for increasing the draft through said fuel bed, a damper movable to a predetermined position for restricting the draft through said fuel bed when said fan is inactive, an operating element responsive to heat for gradually moving said damper from said predetermined position and effective to gradually return said damper to said position upon cooling of said element, an electric heater for said element in heat transfer relation with the draft to said fuel bed for varying the heating of said element to position said damper for maintaining the draft through said fuel bed substantially constant upon normal variations in the thickness thereof during operation of said fan, and automatic means for controlling the energization of said heater and said fan.

5. In combination, a furnace having a fuel bed variable in thickness, an electrically operated fan for increasing the draft through said fuel bed, a movable damper for controlling said draft, a temperature responsive operating element for gradually closing said damper upon cooling of said element, an electric heater for heating said element to gradually open said damper, means for cooling said element responsively to the draft through said fuel bed to vary the opening of said damper upon variation in the thickness of said fuel bed, and thermostatic means for controlling the energization of said heater and said fan means.

6. In combination, a furnace having a fuel bed variable in thickness, an electrically operated fan for increasing the draft through said fuel bed, a movable damper for controlling said draft, a temperature responsive operating element for gradually closing said damper upon cooling of said element, an electric heater for heating said element to gradually open said damper, adjustable means interconnected with said electric heater for varying the energization thereof to control the opening of said damper, means for cooling said element responsively to the draft through said fuel bed to vary the opening of said damper upon variation in the thickness of said fuel bed, and thermostatic control means for controlling the energization of said heater and said fan means.

7. In combination, a furnace having a fuel bed variable in thickness, an electrically operated fan for increasing the draft through said fuel bed, a movable damper for controlling said draft, a temperature responsive operating element for gradually closing said damper upon cooling of said element, an electric heater for heating said element to gradually open said damper, means for cooling said element responsively to the draft through said fuel bed to vary the opening of said damper upon variation in the thickness of said fuel bed, thermostatic means for controlling the energization of said heater, and control means responsive to movement of said damper for energizing said fan upon movement of said damper from a predetermined closed position and for deenergizing said fan upon movement of said damper to said position.

8. In combination, a stoker furnace having a fuel bed, electrically operated means for supplying fuel thereto, separate electrically operated means for increasing the draft through said fuel bed, a movable damper for controlling said draft, a temperature responsive operating element for gradually closing said damper upon the cooling of said element, an electric heater for heating said element to gradually open said damper, thermostatic control means for energizing and deenergizing said heater, means for cooling said element responsively to the draft through said fuel bed to vary the opening of said damper upon variation in the thickness of said fuel bed, control means for energizing said fan upon movement of said damper from a predetermined closed position, and control means for deenergizing said fuel supply means when said damper moves to a predetermined open position.

RONALD W. OLSEN.